United States Patent
Wang et al.

(10) Patent No.: US 12,424,926 B2
(45) Date of Patent: Sep. 23, 2025

(54) PARTIALLY BOOTSTRAPPED GATE DRIVING CIRCUIT FOR REDUCING SWITCHING LOSS AND CONTROL METHOD THEREOF

(71) Applicants: Huazhong University of Science and Technology, Wuhan (CN); Shenzhen Union Semiconductor Co., LTD, Shenzhen (CN)

(72) Inventors: Zhiqiang Wang, Wuhan (CN); Cheng Qian, Wuhan (CN); Guoqing Xin, Wuhan (CN); Xiaojie Shi, Shenzhen (CN)

(73) Assignees: Huazhong University of Science and Technology, Wuhan (CN); Shenzhen Union Semiconductor Co., LTD, Shenzhen (CN)

( * ) Notice: Subject to any disclaimer, the term of this patent is extended or adjusted under 35 U.S.C. 154(b) by 318 days.

(21) Appl. No.: 17/983,919

(22) Filed: Nov. 9, 2022

(65) Prior Publication Data

US 2023/0336071 A1    Oct. 19, 2023

(30) Foreign Application Priority Data

Apr. 18, 2022   (CN) .......................... 202210404306.8

(51) Int. Cl.
*H02M 1/088* (2006.01)
*H02M 1/00* (2006.01)

(52) U.S. Cl.
CPC ......... *H02M 1/088* (2013.01); *H02M 1/0029* (2021.05); *H02M 1/0054* (2021.05)

(58) Field of Classification Search
CPC ............ H02M 1/0006; H02M 1/0029; H02M 1/0048; H02M 1/0054; H02M 1/0067; H02M 1/0085; H02M 1/0095; H02M 1/08; H02M 1/088; H02M 1/092; H02M 3/02; H02M 3/04; H02M 3/06–078; H02M 3/155; H02M 3/156; H02M 3/158; H02M 3/1588; Y02B 70/00; Y02B 70/10
(Continued)

(56) References Cited

U.S. PATENT DOCUMENTS

2020/0403607 A1* 12/2020 Escudero Rodriguez ................... H02M 3/073
2022/0376633 A1* 11/2022 Li ....................... H02M 7/4815

FOREIGN PATENT DOCUMENTS

| CN | 204577431 U | 8/2015 |
| CN | 209561414 U | 10/2019 |
| CN | 112067877 A | 12/2020 |

* cited by examiner

*Primary Examiner* — Thienvu V Tran
*Assistant Examiner* — Carlos O Rivera-Perez
(74) *Attorney, Agent, or Firm* — Nitin Kaushik

(57) ABSTRACT

The present invention belongs to the technical field of gate driving circuits, and discloses a partially bootstrapped gate driving circuit for reducing switching loss and a control method thereof. The partially bootstrapped gate driving circuit for reducing the switching loss comprises a switching device, PWM, a power supply, signal isolation, non-isolated driving chips, a bootstrap structure, a driving resistor, Mon and Moff. The bootstrap structure is used in the present invention, which can realize voltage doubling output without increasing the power supply, overcomes limitation of parasitic resistance inside a large gate of a wide band gap device, and can significantly reduce the switching loss.

8 Claims, 9 Drawing Sheets

(58) Field of Classification Search
USPC ........ 323/222–226, 266, 271–275, 282–285,
323/351; 363/59–63, 65; 327/108–112
See application file for complete search history.

PARTIALLY BOOTSTRAPPED GATE DRIVING CIRCUIT FOR REDUCING SWITCHING LOSS AND CONTROL METHOD THEREOF

CROSS-REFERENCE TO RELATED APPLICATIONS

The application claims priority to Chinese patent application No. 2022104043068, filed on Apr. 18, 2022, the entire contents of which are incorporated herein by reference.

TECHNICAL FIELD

The present invention belongs to the technical field of gate driving circuits, and in particular relates to a partially bootstrapped gate driving circuit for reducing switching loss and a control method thereof.

BACKGROUND

At present, with the development of traffic electrification and new energy, more and more power electronic converters have been applied. Efficiency improvement of electronic converters plays an important role in reducing energy consumption and carbon emission; and reducing switching loss is a main method to improve the efficiency of the converters. The switching loss of the converter is directly related to an adopted gate driving circuit. By improving the gate driving circuit to reduce the switching loss, the purpose of saving energy and reducing carbon emission can be achieved. Therefore, it is of great significance to developing a gate driving technology that can reduce the switching loss.

At present, there are several solutions of gate driving circuits at home and abroad. One is a driving circuit based on a voltage source, that is, a positive voltage is output when a device is turned on; a negative voltage is output when the device is turned off; and a switching speed and switching loss are adjusted by connecting a resistor behind the voltage source. Although this method can reduce the switching loss by reducing the resistance, the effect of reducing the loss is limited due to large parasitic resistance inside a gate of a wide band gap device. The second type is a driving circuit based on a current source, that is, through energy storage elements such as inductors, a positive current is injected into the gate when the device is turned on; a negative current is injected into the gate when the device is turned off; and the switching loss can be adjusted by adjusting the current. If additional inductors and control circuits are needed in this method, the volume of the driving circuit will be greatly increased; and if switching-in and switching-out timing of the current source cannot be accurately controlled, the gate will be overcharged to damage power devices. The third type is an active driving circuit with complex control logics. By monitoring voltage and current parameters of the device and adjusting a driving speed in real time, parasitic oscillation can be suppressed besides loss reduction. Although this method has good performance, it needs a large number of peripheral circuits, which not only increases the cost, but also reduces reliability of the whole system. On the other hand, when an existing driving circuit is applied to a wide band gap device, it is limited by the large parasitic resistance inside the gate of wide band gap device, which requires an additional power supply to improve the switching speed and also leads to additional cost.

Cree Company is taken as an example. All the gate driver products introduced are basically voltage source driving circuits. Except for non-core parts, core parts of general commercial gate drivers are shown in FIG. 9. G and s are outputs of a gate driver, which are connected to a gate of a switching device; and PWM signal is a control signal connected with a control circuit and an interface circuit. When the PWM control signal intends to turn on the switching device, Mon is turned on; Moff is turned off; and a gs output voltage is 15V. When the PWM signal intends to turn off the device, Moff is turned on; Mon is turned off; and a gs output voltage is −5V. Ron and Roff are used for adjusting a switching speed. In addition to the widely used commercial gate driver structure, there are also structures using several power supplies, which use multiple control signals for state switching. However, these structures all have many shortcomings.

Therefore, it is still necessary to research a solution of a driving circuit which does not need an additional power supply and complex control signals, is simple and reliable, and can effectively reduce switching loss.

Based on the above analysis, existing problems and defects of the prior art are as follows.

(1) The parasitic resistance inside a gate of a wide band gap device is large; and the current injected into the gate under driving by a voltage source will be limited by the resistance, so it is necessary to use an additional high-voltage power supply to further improve a switching speed. However, on the one hand, the additional power supply greatly increases the cost of a driver; and on the other hand, due to limitation on stability of gate oxides of a switching device, voltage boost space used for driving is very small.

(2) A driving circuit based on a current source needs to use additional inductance to generate a constant current, which on the one hand increases the cost, and on the other hand requires an additional control circuit. More importantly, if charging time cannot be well controlled in the process of charging the gate with the inductance, the gate will be overcharged. Due to stability of the gate oxide of the switching device, the excessive gate voltage will damage reliability of the device, or even directly damage the device when the case is serious.

(3) An existing active driving circuit with complex control logics needs to switch an output voltage or an output current in real time according to a working state of the switching device. Although this method can provide the best driving performance in theory, normal work thereof extremely depends on monitoring of a working state of the switching device. On the one hand, additional monitoring hardware will increase the cost; and on the other hand, measured information needs to be calculated in a microcontroller, which will lead to occupation of computing resources.

(4) A traditional driving circuit only needs one control signal, while the existing current source driving circuit or active driving circuit often needs a large number of auxiliary control signals to ensure normal operations of the circuit. Too many control signals will not only occupy more microcontroller port resources, but will also make the anti-interference ability of the driving circuit worse.

SUMMARY

Aiming at problems existing in the prior art, the present invention provides a partially bootstrapped gate driving circuit for reducing switching loss and a control method thereof.

The present invention is realized in this way: A control method of a partially bootstrapped gate driving circuit for reducing switching loss, wherein the control method of the partially bootstrapped gate driving circuit for reducing the switching loss comprises: in the driving circuit, a bootstrap structure is used as an output part, so that the driving circuit can output twice a supply voltage in a switching process without using an additional power supply; and by controlling the capacitance of a capacitor, an output voltage of the driving circuit automatically drops to the supply voltage of a power supply at the end of the switching process.

Further, wherein the bootstrap structure is composed of at least one capacitor and at least one diode, and is used for doubling the voltage of the power supply to increase a switching speed in an output transient state.

Further, wherein the control method of the partially bootstrapped gate driving circuit for reducing the switching loss specifically comprises the following steps:

step 1: in a power-off steady state, PWM is at a low level; outputs of driving chips Bon and Boff are low level outputs; a switch Mon is turned off; and a switch Moff is turned on;

step 2: in a power-on dynamic state, the PWM is switched from the low level to a high level; the outputs of the driving chips Bon and Boff are high level outputs; the switch Mon is turned on; and the switch Moff is turned off;

step 3: in a power-on steady state, the PWM is at the high level; the outputs of the driving chips Bon and Boff are the high level outputs; the switch Mon is turned on; and the switch Moff is turned off; and step 4: in a power-off dynamic state, the PWM is switched from the high level to the low level; the outputs of the driving chips Bon and Boff are the low level outputs; the switch Mon is turned off; and the switch Moff is turned on.

Further, wherein in step 1, a power-on part is in a pre-charging state; Con is charged to 15V to prepare for a next power-on dynamic state; charges on Coff are completely discharged in the previous stage: the diode Doff is turned on; a gate voltage of a switching device is −5V; and the switching device is in a reliable power-off state.

Further, wherein in step 2, the power-off part is separated from the switching device and enters the pre-charging state; Coff is charged to 5V to prepare for subsequent power-off dynamic states; because the voltage at both ends of the capacitor can't suddenly change, the power-on part is bootstrapped and doubled to 30V; the voltage gradually decreases with a current supplied to the switching device by driving; and if a capacitance value is reasonably designed to make a stored voltage equal to a total gate charge of the device, the charges on Con will be completely discharged automatically at the end of powering-on, which will not lead to gate overcharging.

Further, wherein in step 3, the power-off part is in the pre-charging state; Coff is charged to 5V to prepare for the next power-off state; because the charges on Con are completely released in the previous stage, the diode Don is turned on; the gate voltage of the switching device is 15V; and the switching device is in a reliable power-on state.

Further, wherein in step 4, the power-on part is separated from the switching device and enters the pre-charging state; Con is charged to 15V to prepare for the subsequent power-on states; because the voltage across the capacitor can't suddenly change, the power-off voltage is bootstrapped to −10V; the voltage gradually decreases with the power-off process; and if the capacitance value is reasonably designed to make the stored voltage equal to the total gate charge of the device, the charges on Coff will be completely released automatically at the end of powering-off, thereby preventing gate overcharging.

Another purpose of the present invention is to provide a partially bootstrapped gate driving circuit for reducing switching loss, which comprises: a switching device, which is equivalent by connecting resistance and capacitance in series;

a control signal input unit of a PWM microcontroller, wherein a high level indicates turning-on of the device; and a low level indicates turning-off of the device;

a power supply, which is a DC power supply module with 15V and 5V outputs and responsible for supplying power to other parts of a circuit;

a signal isolation unit, which is used for isolating the microcontroller from a main power device;

non-isolated driving chips, which are used for switching a working state of the circuit according to a PWM control signal;

a bootstrap structure, which comprises capacitors and diodes and is responsible for providing a faster driving speed and reducing driving loss when the driving circuit works;

gate resistors, which are used for adjusting a switching speed to balance the switching loss and a transient overvoltage; and a metal oxide semiconductor field effect transistor (MOSFET) used for controlling a working state of the circuit and switching.

Another purpose of the present invention is to provide a power electronic converter for traffic equipment, wherein the power electronic converter for the traffic equipment is equipped with the partially bootstrapped gate driving circuit for reducing the switching loss.

Combining the above technical solution and the technical problems solved, please analyze the advantages and positive effects of the technical solution to be protected by the present invention from the following aspects:

Firstly, aiming at the technical problems existing in the above-mentioned prior art and the difficulty of solving these problems, through close combination with the technical solution to be protected and results and data in the research and development process, the technical problems solved by the technical solution of the present invention are analyzed in detail and deeply: and some creative technical effects are brought after the problems are solved. The specific description is as follows:

In the driving circuit, an output part is a bootstrap structure, so that the driving circuit of the present invention can output twice a driving voltage in a switching process without using an additional power supply, thereby greatly improving a switching speed. According to the present invention, by controlling capacitance values of Con and Coff, an output voltage of the driving circuit can be automatically reduced to a power supply voltage at the end of the switching process, thereby avoiding overcharging and needing no additional control signal.

Secondly, regarding the technical solution as a whole or from the perspective of products, the technical effects and advantages of the technical solution to be protected by the present invention are specifically described as follows:

Compared with voltage source driving, the present invention can obviously improve the switching speed and reduce the switching loss; compared with current source driving, the present invention has a characteristic of self-adaptation, does not need additional time sequence control, does not have a risk of overcharge loss of a switching device, and does not need additional inductance; and compared with complex active driving, the present invention has the advantages of a simple structure and high reliability. In addition, the bootstrap structure is used in the present invention, which can realize voltage doubling output on the premise of not increasing the power supply, overcomes limitation of a wide band gap device on the switching speed due to parasitic resistance inside a gate, and can significantly reduce the switching loss.

A commercial gate driver is mainly a voltage source driving circuit. Compared with commercial driving, the present invention can greatly reduce the switching loss, without additional control signals and power supply, and with a simple structure and good stability.

Thirdly, creative auxiliary evidence as the claims of the present invention is also embodied in the following important aspects.

(1) The expected income and commercial value of the technical solution of the present invention after conversion are as follows:

Commercial driving circuits are basically voltage source driving circuits, which can't provide enough driving currents when gate resistance of a switching device is large, so the switching speed is slow; and switching loss is large. At present, many methods to increase driving currents have been put forward in academic circles, such as using inductance to generate a constant current or using a higher voltage power supply to generate a larger driving current. However, these methods all need additional control signals, additional inductance and additional isolated power supplies. The cost of the additional hardware mostly exceeds the cost of commercial driving circuits, so these methods are difficult to be commercialized. On the other hand, most of these circuits are not self-adaptive; and even switching devices will be damaged when the control fails. According to the present invention, an output structure similar to the bootstrap circuit and reasonable control are used, so that the gate driver can temporarily output twice the power supply voltage; and the output voltage will gradually decrease with the switching process, and finally automatically attenuate to the power supply output voltage at the end of the switching process, which will not cause gate overcharging or damage to the device. The biggest advantage of the present invention is that the proposed driving circuit needs no additional power supply or additional control signal, and only needs a few of low-cost and low-voltage devices. The present invention has a characteristic of self-adaption and won't damage the device when working conditions change, so that the solution has great commercial potential.

According to experimental results of a built prototype, using the driving circuit structure of the present invention to replace the traditional commercial driving can reduce the power-on loss by 50%-75% and the power-off loss by about 10%, so the present invention can greatly reduce the switching loss of a converter, improve the efficiency and save energy.

(2) The technical solution of the present invention fills the technical gap in the domestic and foreign industries:

Compared with existing driving circuit solutions at home and abroad, the present invention is the first gate driving circuit that can automatically adapt to different load conditions and significantly reduce the switching loss without using additional power supply or control signals. The symmetrical bootstrap structure of the power-on and power-off parts is also proposed for the first time, which fills the research gap in the art.

(3) Whether the technical solution of the present invention has solved the technical problems that people have been eager to solve, but have never been successful:

At present, many methods to improve driving performance have been put forward in academic circles, such as using inductance to generate a constant current or using a higher voltage power supply to generate a larger driving current. However, these methods all need additional control signals, additional inductance and additional isolated power supplies. The cost of the additional hardware mostly exceeds the cost of commercial driving circuits, so these methods are difficult to be commercialized. On the other hand, most of these circuits are not self-adaptive; and even switching devices will be damaged when the control fails. The present invention solves a new structure of the driving circuit, which obviously reduces the switching loss without obviously increasing hardware cost and control complexity.

DETAILED DESCRIPTION OF THE EMBODIMENTS

Aiming at the problems existing in the prior art, the present invention provides a partially bootstrapped gate driving circuit for reducing switching loss and a control method thereof. The present invention will be described in detail with reference to the accompanying drawings.

First: explanatory embodiments. In order to make those skilled in the art fully understand how the present invention can be implemented, this part involves the explanatory embodiments for explaining the technical solution of the claims.

Figure 1:
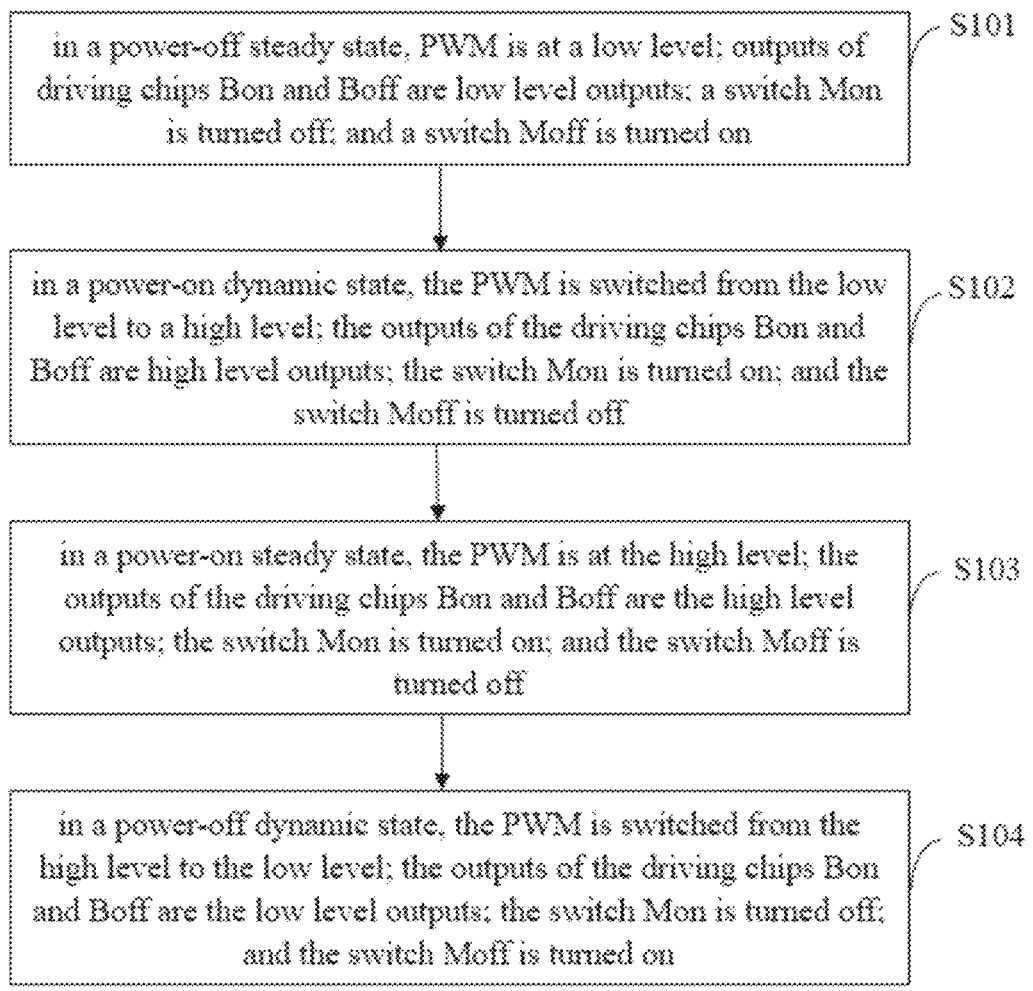
FIG. 1 is a flowchart of a control method of a partially bootstrapped gate driving circuit for reducing switching loss provided by an embodiment of the present invention.

As shown in FIG. 1, a control method of a partially bootstrapped gate driving circuit for reducing switching loss provided by an embodiment of the present invention comprises the following steps:

S101: in a power-off steady state, PWM is at a low level; outputs of driving chips Bon and Boff are low level outputs; a switch Mon is turned off: and a switch Moff is turned on;

S102: in a power-on dynamic state, the PWM is switched from the low level to a high level; the outputs of the driving chips Bon and Boff are high level outputs; the switch Mon is turned on; and the switch Moff is turned off;

S103: in a power-on steady state, the PWM is at the high level: the outputs of the driving chips Bon and Boff are the high level outputs; the switch Mon is turned on; and the switch Moff is turned off; and S104: in a power-off dynamic state, the PWM is switched from the high level to the low level; the outputs of the driving chips Bon and Boff are the low level outputs; the switch Mon is turned off; and the switch Moff is turned on.

Figure 2:
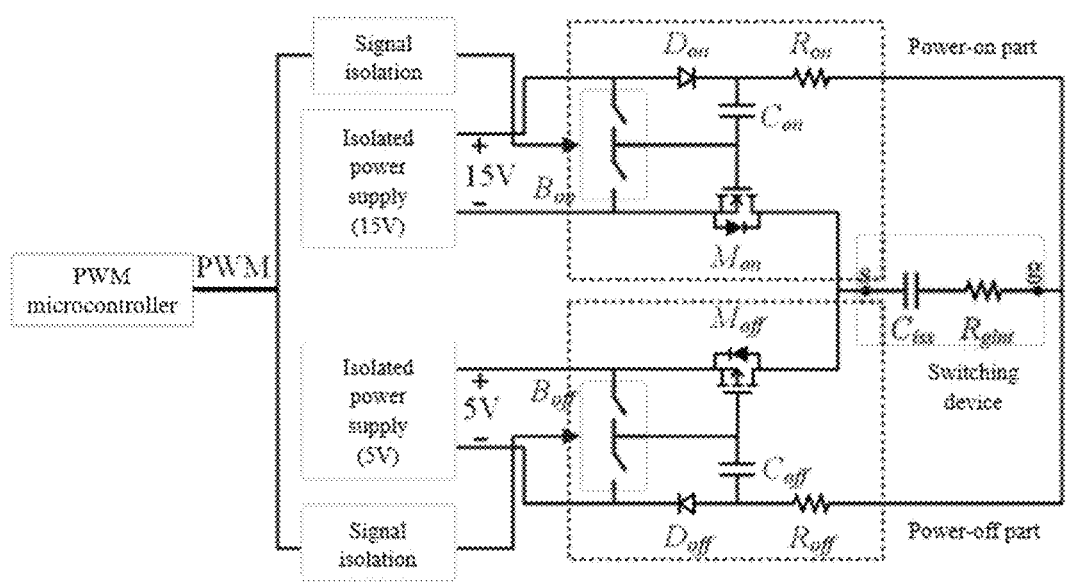
FIG. 2 is a schematic structural diagram of a partially bootstrapped gate driving circuit for reducing switching loss provided by an embodiment of the present invention.

As shown in FIG. 2, a novel partially bootstrapped driving circuit structure provided by the embodiment of the present invention can be divided into a power-on part and a power-off part.

A switching device is equivalent by connecting resistance and capacitance in series, wherein the resistance is parasitic resistance inside a gate of the switching device; and the capacitance is input capacitance of the switching device;

in a control signal input unit of a PWM microcontroller, a high level indicates turning-on of the device; and a low level indicates turning-off of the device;

a power supply is a DC power supply module with 15V and 5V outputs and responsible for supplying power to other parts of a circuit;

a signal isolation unit is used for electrically isolating the microcontroller from a main power device;

Bon and Boff are non-isolated driving chips which are used for switching a working state of the circuit according to a PWM control signal;

Don and Doff are diodes; and Con and Coff are capacitors. Don, Con, Doff and Coff form a bootstrap structure, which is used for providing a faster driving speed and reducing driving loss when the driving circuit works;

Ron and Roff are driving resistors, which are used for adjusting the driving speed to balance the switching loss and a transient overvoltage; and a metal oxide semiconductor field effect transistor (Mon is n-type MOSFET; and Moff is p-type MOSFET) is used for controlling a working state of the circuit and switching.

A preferred embodiment of the present invention, as shown in FIG. 2, specifically comprises the followings.

(1) A PWM signal is an output control signal of the microcontroller; a high level indicates that the switching device needs to be turned on: a low level indicates that the switching device needs to be turned off; and a switching device frame indicates an actual switching device, which is generally a silicon carbide field effect transistor or a silicon IGBT, and can be simply equivalent by a capacitor-resistor in-series structure.

(2) A main function of signal isolation is to electrically isolate the control signal from a main circuit to protect a control circuit.

(3) An isolated power supply is responsible for supplying power to the whole circuit. Generally, a 15V power supply module and a 5V power supply module are required; and specific voltages can be fine-tuned according to application requirements.

(4) Bon and Boff are driving chips. When PWM is at the high level, outputs of the driving chips will be connected to a high potential of power supply thereof: and when the PWM signal is at the low level, the outputs of the driving chips will be connected to a ground potential of power supply thereof. Loads of these two elements switch the working state of the circuit according to the control signal.

(5) Mon is an NMOS; and Moff is a PMOS. These two elements are related to switching of the circuit working state.

(6) Con and Coff are capacitors; Don and Doff are diodes; and Con, Coff, Don and Doff together form the bootstrap structure, which is used for doubling the voltage of the power supply in an output transient state to improve the switching speed.

(7) Ron and Roff are gate resistors, which are used for adjusting the switching speed.

Figure 3:
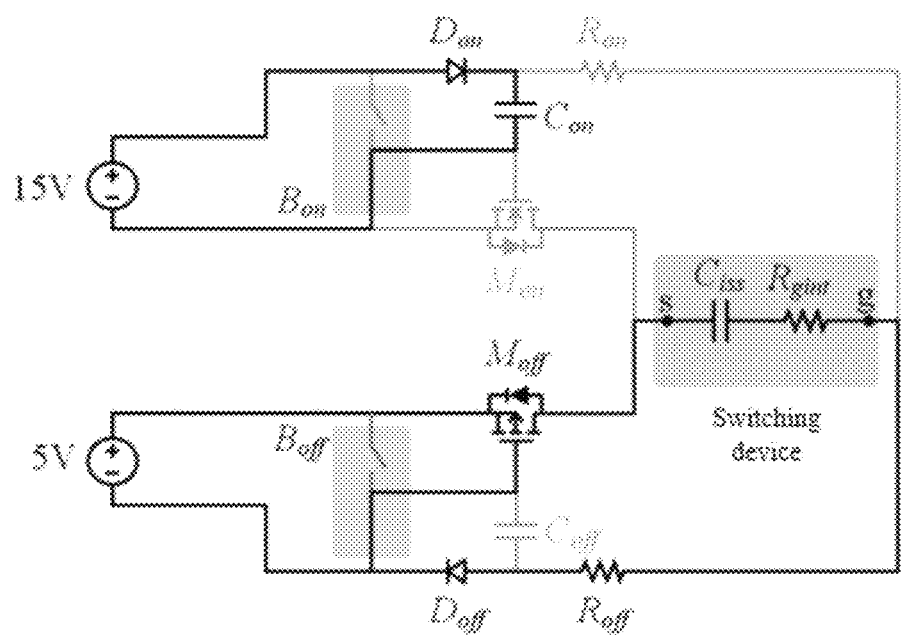
FIG. 3 is a schematic diagram of an equivalent circuit in a power-off steady state provided by an embodiment of the present invention.

A specific operation mode of the circuit provided by the embodiment of the present invention is as follows:

1. Ina power-off steady state, the equivalent circuit is shown in FIG. 3. In the power-off steady state, the PWM signal is at the low level; and both driving chips Bon and Boff output low levels. Therefore, Mon is in a power-off state; and Moff is in a power-on state. The power-on part is separated from the switching device; Con is charged by the 15V power supply to prepare for subsequent actions; charges on Coff are completely discharged in the previous stage, so Doff is turned on; the gate voltage of the switching device is −5V; and the steady power-off state is kept.

Further, in the power-off steady state, since the PWM is at the low level at this time; the outputs of the driving chips Bon and Boff are also low level outputs, so the switch Mon is turned off; and the switch Moff is turned on.

At this time, the power-on part is in a pre-charging state; and Con is charged to 15V to prepare for a next power-on dynamic state. The charges on Coff are completely discharged in the previous stage, so the diode Doff is turned on. At this time, the gate voltage of the switching device (voltage at both ends gs) is −5V; and the switching device is in a reliable power-off state.

Figure 4:
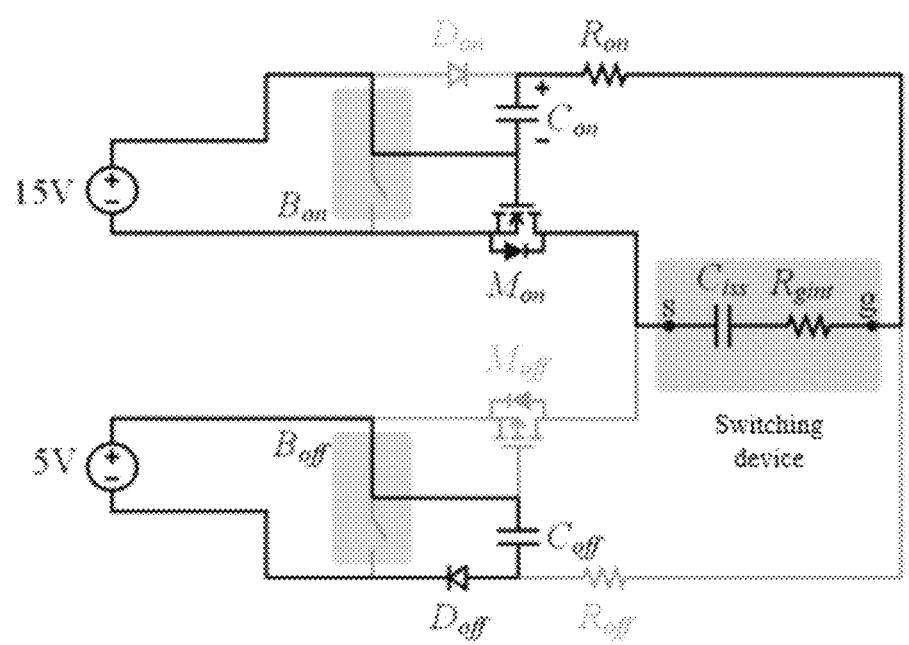
FIG. 4 is a schematic diagram of an equivalent circuit in a power-on dynamic state provided by an embodiment of the present invention.

2. In a power-on dynamic state, the equivalent circuit is shown in FIG. 4. At this time, PWM is switched from the low level to a high level; and the outputs of the driving chips Bon and Boff are also high level outputs. Therefore, the switch Mon is turned on; and the switch Moff is turned off. Specifically, in the power-on dynamic state, the PWM signal changes from the low level to the high level; and both the driving chips Bon and Boff output the high level. Therefore, Mon is in a power-on state; and the Moff is in a power-off state. The power-off part is separated from the switching device; and Coff is charged to 5V by the power supply to prepare for subsequent switching. Because the voltage at both ends of the capacitor cannot suddenly change, the output voltage of the driving circuit is twice the steady-state power-on voltage, that is, 30V, at the moment when the PWM changes from low to high. With the power-on process, the charges on Con will gradually decrease. By controlling the size of Con, it can be ensured that the output of the driving circuit will automatically decrease to 15V at the end of the power-on dynamic state, that is, the power-on process will be accelerated in the power-on dynamic state; and the gate will not be overcharged in the steady state.

At this time, the power-off part is separated from the switching device and enters the pre-charging state; and Coff is charged to 5V to prepare for subsequent power-off dynamic states. Because the voltage at both ends of the capacitor can't suddenly change, the power-on part will be bootstrapped and doubled to 30V; and the voltage will gradually decrease with a current supplied to the switching device by driving. If a capacitance value is reasonably designed to make a stored voltage equal to a total gate charge of the device, the charges on the Con will be completely discharged automatically at the end of powering-on, which will not lead to gate overcharging.

Figure 5:
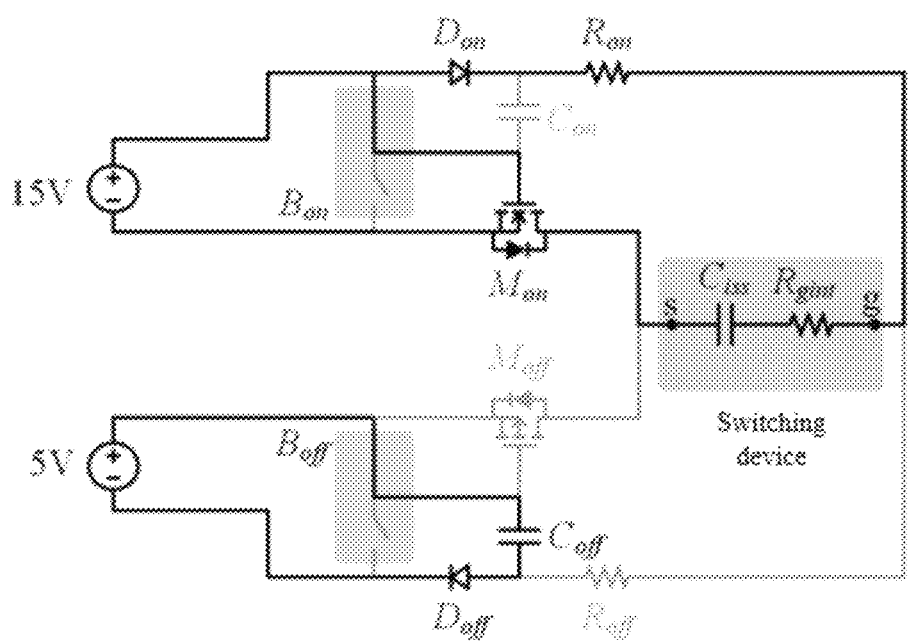
FIG. 5 is a schematic diagram of an equivalent circuit in a power-on steady state provided by an embodiment of the present invention.

3. In a power-on steady state, the equivalent circuit is shown in FIG. 5.

In the power-on steady state, since PWM is at the high level at this time, the outputs of the driving chips Bon and Boff are also high level outputs, so the switch Mon is turned on; and the switch Moff is turned off.

At this time, the power-off part is in a pre-charging state; and Coff is charged to 5V to prepare for a next power-off state. Because the charges on Con are completely discharged in the previous stage, the diode Don is turned on; the gate voltage of the switching device is 15V at this time; and the switching device is in a reliable power-on state.

Specifically, in the power-on steady state, the PWM signal is at the high level; and both the driving chips Bon and Boff output the high level. Therefore, Mon is in a power-on state; and the switch Moff is in a power-off state. The power-off part is separated from the switching device; and Coff is charged to 5V by the power supply to prepare for subsequent switching. The charges on Con are completely discharged in the previous stage, so Don is turned on; the gate voltage of the switching device is 15V; and a steady power-on state is kept.

Figure 6:
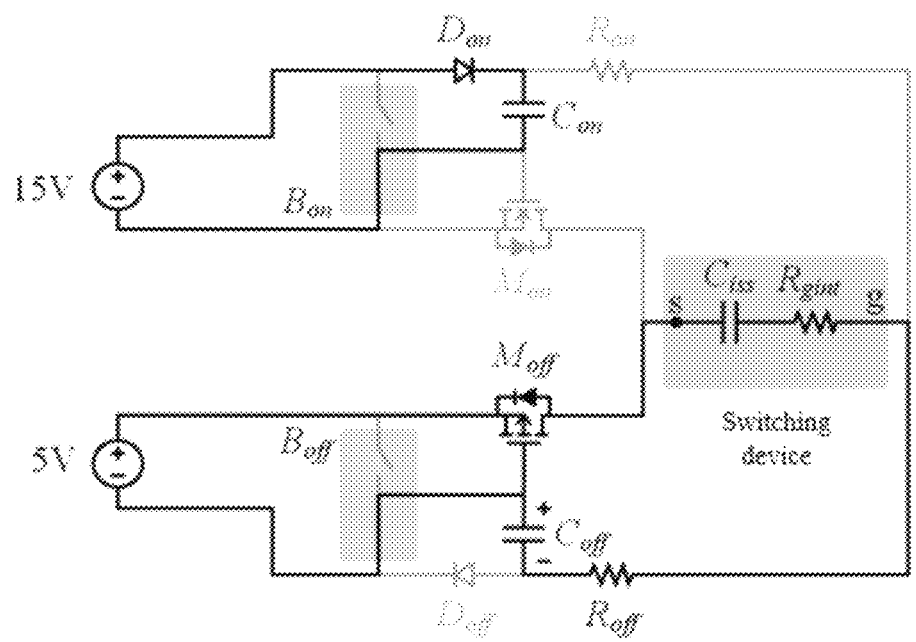
FIG. 6 is a schematic diagram of an equivalent circuit in a power-off dynamic state provided by an embodiment of the present invention.

4. In a power-off dynamic state, the equivalent circuit is shown in FIG. 6.

At this time, PWM is switched from the high level to the low level; and the outputs of the driving chips Bon and Boff are also low level outputs. Therefore, Mon is turned off; and the switch Moff is turned on. At this time, the power-on part is separated from the switching device and enters the pre-charging state; and Con is charged to 15V to prepare for the subsequent power-on states. As the voltage at both ends of the capacitor can't suddenly change, the power-off voltage will be bootstrapped to −10V at this time; and the voltage will gradually decrease with the power-off process, if the capacitance value is reasonably designed to make the stored voltage equal to the total gate charge of the device, the charges on the Coff will be completely released automatically at the end of powering-off, thereby preventing gate overcharging.

Specifically, in the power-off dynamic state, the PWM signal changes from the high level to the low level; and both the driving chips Bon and Boff output the low level. Therefore, Mon is in a power-off state; and Moff is in a power-on state. The power-on part is separated from the switching device; and Con is charged to 15V by the power supply to prepare for subsequent switching. Because the voltage at both ends of the capacitor cannot suddenly change, the output voltage of the driving circuit is twice the steady power-off voltage, that is, −10V, at the moment when the PWM changes from high to low. With the process of the power-off dynamic state, the charges on Coff will gradually decrease. By controlling the size of Coff, it can be ensured that the output of the driving circuit will automatically decrease to −5V at the end of the power-off dynamic state, that is, the power-off process will be accelerated in the power-off dynamic state; and the gate will not be overcharged in the steady state.

Due to use of the bootstrap structure, the driving circuit of the present invention can output twice the driving voltage in the switching process without using an additional power supply, thereby greatly improving the switching speed. According to the present invention, by controlling the capacitance values of Con and Coff, the output voltage of the driving circuit can be automatically reduced to the power supply voltage at the end of the switching process, thereby avoiding overcharging and needing no additional control signal.

Second: application embodiments. In order to prove creativity and technical values of the technical solution of the present invention, this part involves the application embodiment of the technical solution of the claims on specific products or related technologies.

An electrolytic capacitor, a silicon carbide field effect transistor, a Schottky diode and a load inductor are used to build a prototype of a Buck converter; and a test is made. After testing, compared with traditional commercial voltage source driving, the proposed driving circuit can reduce the power-on loss by up to 75% and power-off loss by 10%; and there is no gate overvoltage phenomenon in a working process of the Buck prototype. With changes of junction temperatures and load currents, the proposed driving can automatically adapt to different working conditions.

Third: evidence of relevant effects of the embodiment. The embodiment of the present invention has achieved some positive effects in the process of research and development or use, and indeed has great advantages compared with the prior art. The following contents will be described in combination with the data and charts of the test process.

Figure 7:
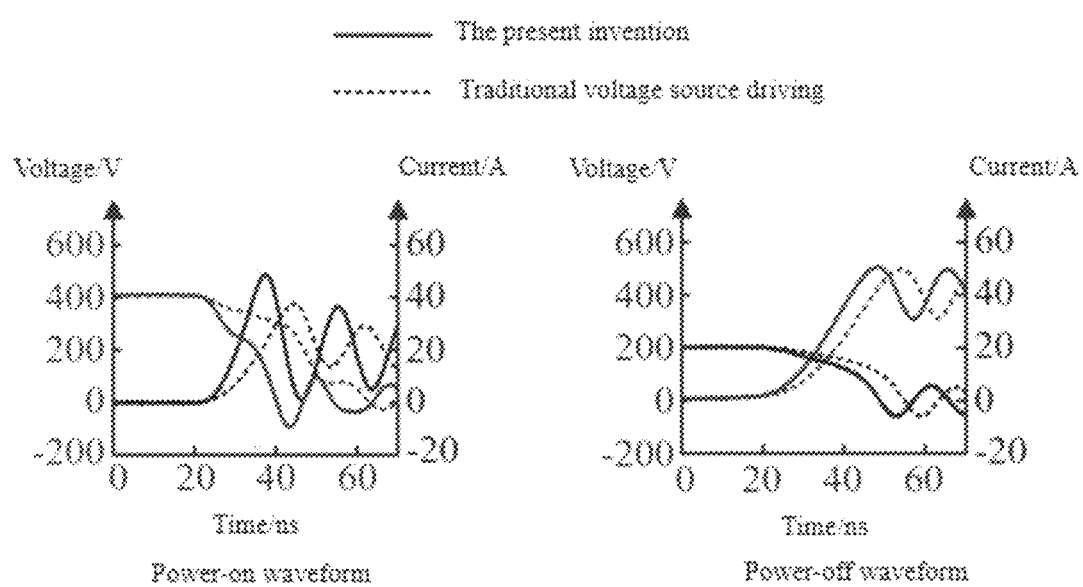
FIG. 7 is an experimental comparison diagram provided by an embodiment of the present invention.
Figure 8:
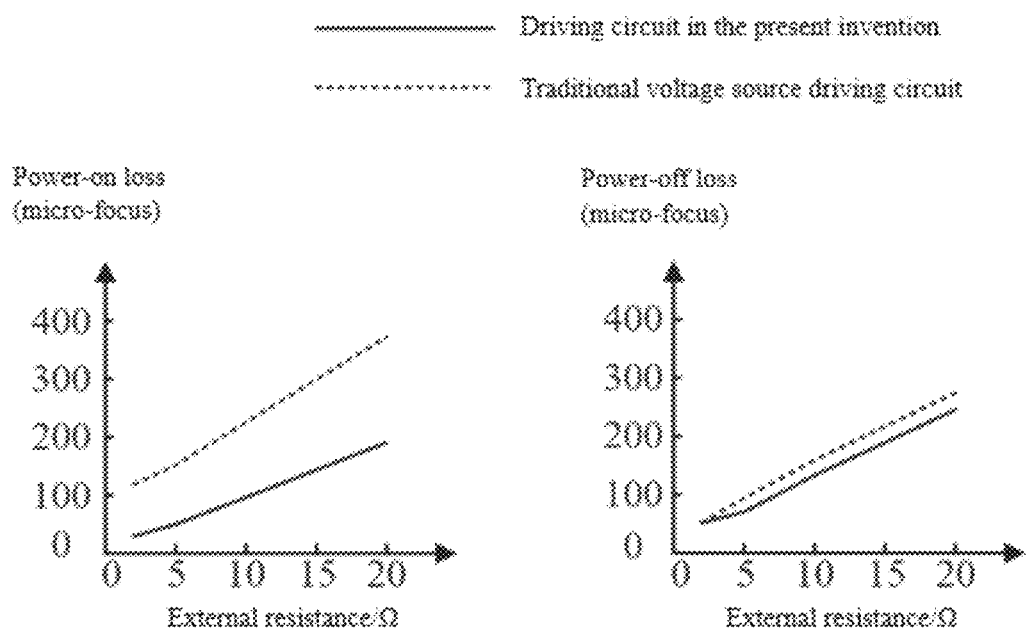
FIG. 8 is a loss reduction effect diagram provided by an embodiment of the present invention.
Figure 9:
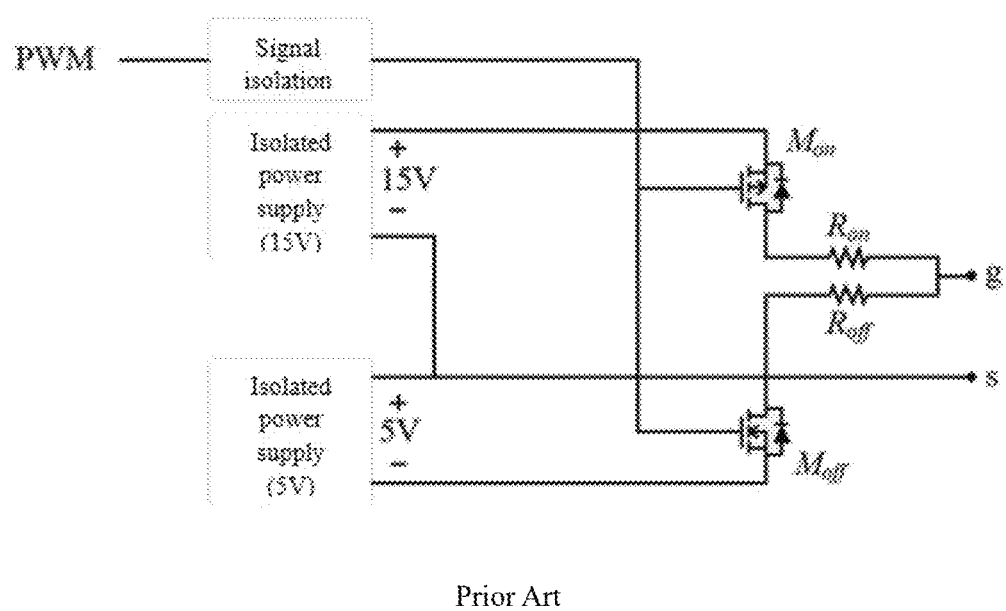
FIG. 9 is a schematic diagram of a core structure of a commercial gate driver in a prior art provided by an embodiment of the present invention.

Double Pulse Test is a commonly used method to verify performance of switches, which can not only verify switching performance of switching devices, but also verify performance of driving circuits and short-circuit protection circuits. Hardware thereof is almost identical to that of the Buck converter. The difference is that a double pulse test platform generally adopts a pulse operation mode. In the present invention, a double pulse test platform based on a silicon carbide field effect transistor is built; a bus voltage of the test platform is 400V; and a load current can reach 30 A at the highest. A prototype of a gate driver is built. FIG. 7 is an experimental comparison diagram provided by the embodiment of the present invention; and a test is made on the double pulse test platform. According to the experimental test, the proposed gate driving circuit can reduce the power-on loss by 50%-75% and the power-off loss by 10%, as shown in FIG. 8: and the circuit works stably without gate overcharging. FIG. 9 is a schematic diagram of a core structure of a commercial gate driver in the prior art provided by the embodiment of the present invention.

Detailed experimental data pairs of different working conditions under the 400V bus voltage are shown in the following table:

| Working condition | | Commercial voltage source driving | | Driving circuit of the present invention | |
|---|---|---|---|---|---|
| | | Power-on loss (Micro-focus) | Power-off loss (Micro-focus) | Power-on loss (Micro-focus) | Power-off loss (Micro-focus) |
| Gate resistance 2Ω | Load current 10A | 64.6 | 23.9 | 19.5 | 23.3 |
| | Load current 20A | 91.1 | 29.6 | 24.3 | 29.4 |
| | Load current 30A | 118.7 | 51.9 | 29.6 | 51.8 |
| Gate resistance 5Ω | Load current 10A | 75.6 | 25.5 | 33 | 24.2 |
| | Load current 20A | 113.2 | 47.9 | 42.1 | 36.7 |
| | Load current 30A | 152.2 | 94.1 | 50.1 | 70.4 |
| Gate resistance 10Ω | Load current 10A | 96.9 | 33.6 | 54.6 | 29.3 |
| | Load current 20A | 157.8 | 86.1 | 74.9 | 70.4 |
| | Load current 30A | 225.8 | 159.1 | 96.5 | 132.9 |
| Gate resistance 20Ω | Load current 10A | 139.8 | 64.4 | 86.9 | 53.5 |
| | Load current 20A | 249.3 | 159.5 | 137 | 139.2 |
| | Load current 30A | 372.7 | 274.8 | 190.9 | 245.6 |

What is claimed is:

1. A control method of a partially bootstrapped gate driving circuit for reducing switching loss, wherein the control method of the partially bootstrapped gate driving circuit for reducing the switching loss comprises:
   in the partially bootstrapped gate driving circuit, a bootstrap structure is used as an output part, so that the partially bootstrapped gate driving circuit can output twice a supply voltage in a switching process without using an additional power supply; and by controlling a capacitance of a capacitor, an output voltage of the partially bootstrapped gate driving circuit automatically drops to the supply voltage of a power supply at the end of the switching process;
   wherein the control method of the partially bootstrapped gate driving circuit for reducing the switching loss specifically comprises the following steps:
   step 1: in a power-off steady state, PWM is at a low level; outputs of driving chips Bon and Boff are low level outputs; a switch Mon is turned off; and a switch Moff is turned on;
   step 2: in a power-on dynamic state, the PWM is switched from the low level to a high level; the outputs of the driving chips Bon and Boff are high level outputs; the switch Mon is turned on; and the switch Moff is turned off;
   step 3: in a power-on steady state, the PWM is at the high level; the outputs of the driving chips Bon and Boff are the high level outputs; the switch Mon is turned on; and the switch Moff is turned off; and
   step 4: in a power-off dynamic state, the PWM is switched from the high level to the low level; the outputs of the driving chips Bon and Boff are the low level outputs; the switch Mon is turned off; and the switch Moff is turned on; and
   wherein the PWM does not control switches other than the driving chips Bon and Boff.

2. The control method of the partially bootstrapped gate driving circuit for reducing the switching loss according to claim 1, wherein the bootstrap structure is composed of at least one capacitor and at least one diode, and is used for doubling the voltage of the power supply to increase a switching speed in an output transient state.

3. The control method of the partially bootstrapped gate driving circuit for reducing the switching loss according to claim 1, wherein in step 1, a power-on part is in a pre-charging state; an on capacitor (Con) is charged to 15V to prepare for a next power-on dynamic state; charges on an off capacitor (Coff) are completely discharged in the previous stage; the diode Doff is turned on; a gate voltage of a switching device is-5V; and the switching device is in a reliable power-off state.

4. The control method of the partially bootstrapped gate driving circuit for reducing the switching loss according to claim 1, wherein in step 2, a power-off part is separated from the switching device and enters the pre-charging state; an off capacitor (Coff) is charged to 5V to prepare for subsequent power-off dynamic states; because a voltage at both ends of an on capacitor (Con) can't suddenly change, a power-on part is bootstrapped and doubled to 30V; the voltage gradually decreases with a current supplied to the switching device by driving; and if a capacitance value is reasonably designed to make a stored voltage equal to a total gate charge of the switching device, the charges on the on capacitor (Con) will be completely discharged automatically at the end of powering-on, which will not lead to gate overcharging.

5. The control method of the partially bootstrapped gate driving circuit for reducing the switching loss according to claim 1, wherein in step 3, a power-off part is in the pre-charging state; an off capacitor (Coff) is charged to 5V to prepare for the next power-off state; because the charges on an on capacitor (Con) are completely released in the previous stage, a diode Don is turned on; a gate voltage of the switching device is 15V; and the switching device is in a reliable power-on state.

6. The control method of the partially bootstrapped gate driving circuit for reducing the switching loss according to claim 1, wherein in step 4, a power-on part is separated from the switching device and enters the pre-charging state; an on capacitor (Con) is charged to 15V to prepare for the subsequent power-on states; because a voltage across an off capacitor (Coff) can't suddenly change, a power-off voltage is bootstrapped to −10V; the voltage gradually decreases with the power-off process; and if the capacitance value is reasonably designed to make the stored voltage equal to a total gate charge of the switching device, the charges on the off capacitor (Coff) will be completely released automatically at the end of powering-off, thereby preventing gate overcharging.

7. A partially bootstrapped gate driving circuit for reducing switching loss, wherein the partially bootstrapped gate driving circuit for reducing the switching loss comprises: a switching device, which is equivalent by connecting resistance and capacitance in series;
  a control signal input unit of a PWM microcontroller, wherein a high level indicates turning-on of the switching device; and a low level indicates turning-off of the device;
  a power supply, which is a DC power supply module with 15V and 5V outputs and responsible for supplying power to other parts of a circuit;
  a signal isolation unit, which is used for isolating the PWM microcontroller from a main power device;
  non-isolated driving chips, which are used for switching a working state of the circuit according to a PWM control signal, wherein the PWM microcontroller does not provide the PWM control signal to switches other than the non-isolated driving chips;
  a bootstrap structure, which comprises capacitors and diodes and is responsible for providing a faster driving speed and reducing driving loss when the partially bootstrapped gate driving circuit works; and
  gate resistors, which are used for adjusting a switching speed to balance the switching loss and a transient overvoltage.

8. The partially bootstrapped gate driving circuit for reducing the switching loss according to claim 7, wherein the partially bootstrapped gate driving circuit for reducing the switching loss further comprises a metal oxide semiconductor field effect transistor (MOSFET) used for controlling a working state of the circuit and switching.

* * * * *